United States Patent [19]

Langenbacher et al.

[11] Patent Number: 4,975,018

[45] Date of Patent: Dec. 4, 1990

[54] LINEAR UNIT FOR TRANSFERRING OBJECTS

[75] Inventors: Markus Langenbacher, Kornwestheim; Peter Rothfuss, Ditzingen; Gernot Maier, Stuttgart, all of Fed. Rep. of Germany

[73] Assignee: Robert Bosch GmbH, Stuttgart, Fed. Rep. of Germany

[21] Appl. No.: 423,430

[22] PCT Filed: Nov. 20, 1987

[86] PCT No.: PCT/DE87/00531

§ 371 Date: Sep. 22, 1989

§ 102(e) Date: Sep. 22, 1989

[87] PCT Pub. No.: WO88/07492

PCT Pub. Date: Oct. 6, 1988

[30] Foreign Application Priority Data

Mar. 30, 1987 [DE] Fed. Rep. of Germany ....... 3710479

[51] Int. Cl.[5] ............................................ B23Q 1/00

[52] U.S. Cl. ................................ 414/751; 294/81.52; 294/67.32; 414/662; 414/589; 414/225

[58] Field of Search ............... 414/749, 751, 753, 222, 414/225, 226, 589, 662; 198/678, 468.2; 901/36, 31; 294/81.52, 67.32

[56] References Cited

U.S. PATENT DOCUMENTS

| | | | |
|---|---|---|---|
| 3,774,778 | 11/1973 | Flaig | 414/751 X |
| 4,030,614 | 6/1977 | Taneda et al. | 414/751 X |
| 4,240,237 | 12/1980 | Alduk et al. | 414/751 X |

FOREIGN PATENT DOCUMENTS

| | | | |
|---|---|---|---|
| 1945595 | 3/1970 | Fed. Rep. of Germany . | |
| 1155591 | 5/1958 | France . | |
| 53-141984 | 11/1978 | Japan . | |
| 426637 | 6/1967 | Switzerland . | |
| 0667482 | 6/1979 | U.S.S.R. | 294/67.32 |
| 2174628 | 11/1986 | United Kingdom | 414/751 |

*Primary Examiner*—Robert J. Spar

*Assistant Examiner*—James T. Eller, Jr.

*Attorney, Agent, or Firm*—Michael J. Striker

[57] ABSTRACT

A linear unit for transferring objects, particularly for removing workpieces from a linear conveying track, comprising vertically and horizontally movable grippers for grasping the objects and comprising a gripper carriage which is movable between a pick-up position and delivery position and having first and second carriage parts, wherein the movement sequence of the grippers for receiving the objects in the pick-up position and for depositing the objects in the delivery position is effected due to relative movement of the second carriage part with respect to the first carriage part.

6 Claims, 3 Drawing Sheets

22 13 21 24 18 20 35 15 19 25 25 35 II 23 16 10 17 14 14 $h_{rel.}$ II 12 26 30 30 26 11

LINEAR UNIT FOR TRANSFERRING OBJECTS

BACKGROUND OF THE INVENTION

The invention relates to a linear unit for transferring objects, particularly for removing workpieces from a linear conveying track, such as an assembly or manufacturing belt, and comprising vertically and horizontally movable grippers for gripping an object and supported on a gripper carrier movable between pick-up and delivery positions.

For example, in assembly or production lines, such linear units serve to grasp and transfer workpieces which are transported on a linear conveying track, e.g. conveyor belt, e.g. to a second conveyor belt or to a processing station. For this purpose, the grippers are moved by a gripper carrier to a pick-up position, where they grip the workpiece, and then to a delivery position, where they deposit the workpiece again. Costly control mechanisms are required for the coordinated interplay of the gripper movements necessary for gripping and depositing.

SUMMARY OF THE INVENTION

The object of the invention is to simplify the structure of the linear unit for transferring objects.

This object and others which will become more apparent hereinafter is attained by providing a linear movement in which the movement sequence of the grippers for picking up an object at the pick-up position and depositing it at the delivery position is caused by an excess lift of the gripper carrier after it reaches the pick-up and delivery positions. The sequence of movements for gripping or depositing the objects is positively controlled mechanically and is carried out automatically by the excess lift of the gripper carrier after it reaches the pick-up and delivery positions, respectively.

It has proven advisable to divide the sequence of movements of the grippers into a horizontal rotational or swiveling movement and a vertical displacing movement which are carried out one after the other and in the reverse sequence in the pick-up and delivery positions. These two portions of the movement sequence can be achieved by means of the excess lift of the gripper carrier in a simple manner by providing a toothed rack and pinion gearing between the gripper carrier and gripper and by forming the grippers of vertical gripping arms and horizontal gripping fingers which are coupled with one another via a coarse thread connection in each instance. This has the advantage that the individual phases of the movement sequence need not be adapted to the size of the respective object to be transferred, but are independent of this. However, the workpieces are held with the same gripping force regardless of their size. The gripping technology used in the linear unit, according to the invention, is accordingly independent of the size of the object, wherein the maximum size of the workpieces to be grasped is, of course, determined by the distances of the vertical gripping arms from one another.

It is possible to feed and guide away the object to be transferred or gripped on all sides of the linear unit when four vertical gripping arms are provided so as to be equidistant from one another.

An additionally increased gripping force which ensures a secure holding of the gripped object during the movement of the gripper carrier is imparted to the gripping fingers at the end of the movement sequence by forming the coarse thread connection having a length that is less than the excess lift of the gripper carrier with the gripping fingers contacting the object in a force-locking manner. The lifting movement of the gripping fingers is defined by the end of the coarse-thread connection and the remaining slight residual excess lift of the gripper carrier forces a rotation of the gripping arms and, accordingly, an increased contact pressure of the gripping fingers at the object which is already gripped and lifted.

The excess lift of the gripper carrier required in the end stations of the gripper carrier, that is, in the pick-up and delivery position, when the grippers are positioned can be achieved in a simple manner by constructing the gripper carrier as a carriage which reciprocates axially and comprises two carriage parts displaceable relative to one another. One carriage part is being driven to provide reciprocating movement of the carriage, and the second carriage part carries grippers in a fixed spaced relationship relative to one another. The excess lift results from relative movement of the carriage parts which is caused by stops at the ends of the carriage movement.

Other advantageous developments and improvements of the linear unit will become apparent from the following detailed description of the preferred embodiment with reference to appended drawings.

DESCRIPTION OF THE PREFERRED EMBODIMENT

Figure 1:
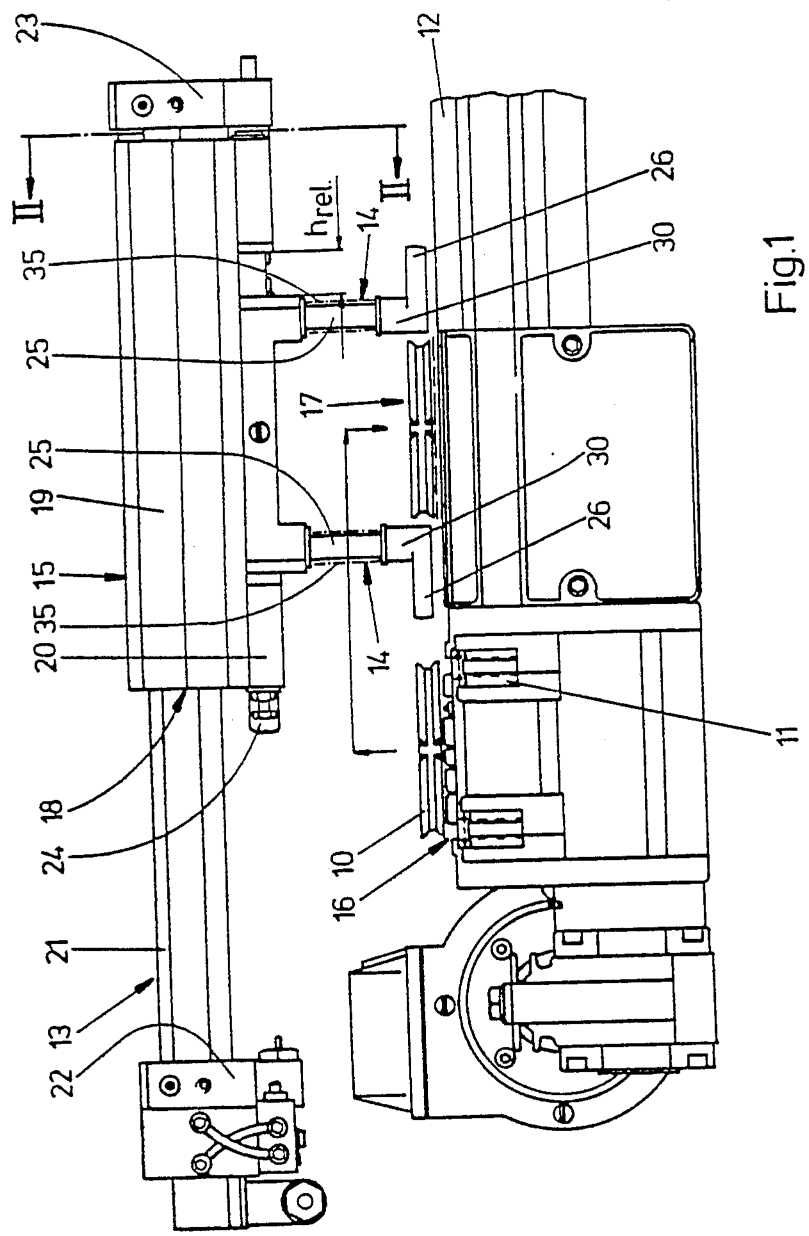
FIG. 1 shows a side view of a conveying device with two conveyor belts and a linear unit according to the invention for transferring workpieces from one conveyor belt to the other.

The conveying device for workpieces designated by 10, which can be seen in a side view in FIG. 1, comprises two linear conveying tracks in the form of two double-belt conveyor belts 11, 12 which extend horizontally relative to one another. In order to transfer the workpieces 10 from one conveyor belt 11 to the other conveyor belt 12, a linear unit 13 is provided which comprises a gripper arrangement comprising four grippers 14 constructed in pairs in a mirror-inverted manner and a longitudinally displaceable gripper carrier 15 which can be moved between a pick-up position 16 and a delivery position 17.

The gripper carrier 15 is constructed as a longitudinally displaceable carriage 18 which comprises an upper carriage 19 and a lower carriage 20 having the same longitudinal dimensions. The upper carriage 19 is guided on two sliding bars 21 so as to be longitudinally displaceable and is driven to provide for displacing movement of the carriage. The displacing movement is defined by two end stops 22 and 23 which extend along the vertical front dimension of the upper carriage 19 as well as along the vertical front dimension of the lower carriage 20. The lower carriage 20 carries a spacing piece 24 on its front side facing the end stop 22. The upper carriage 19 and lower carriage 20 are displaceable relative to one another, wherein the maximum displacing path $h_{rel}$ of the two carriages 19, 20 relative to one another and the excess lift $h_{rel}$ of the upper carriage 19 relative to the lower carriage 20 is determined by the length of the spacing piece 24. The movement sequence of the grippers 14 for picking up a workpiece 10 in the pick-up position 16 and for depositing the workpiece 10 in the delivery position 17 is forced after reaching the pick-up and delivery positions 16, 17, respectively, by means of this excess lift $h_{rel}$.

Figure 2:
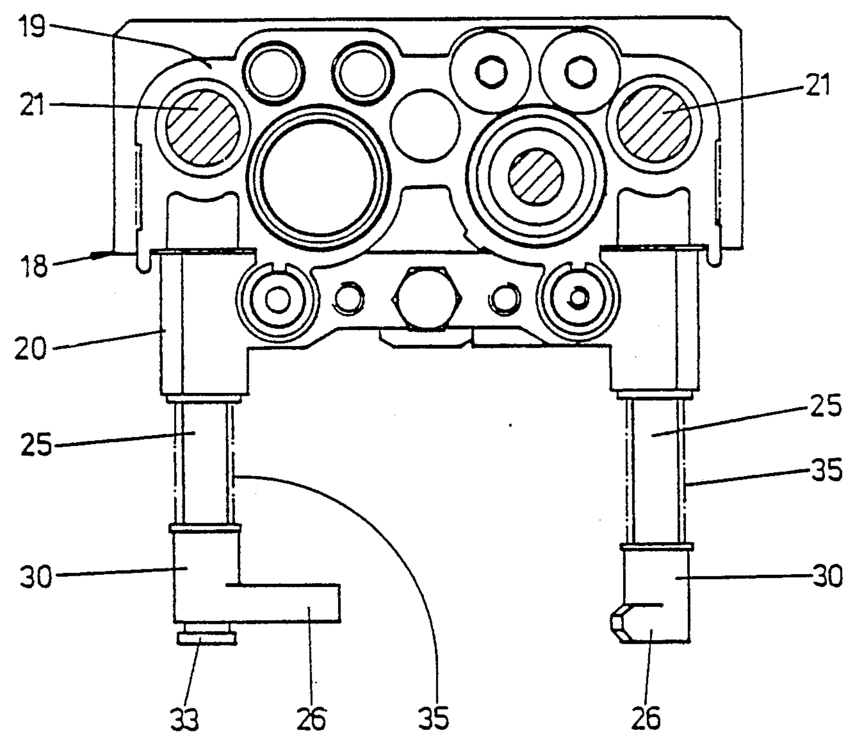
FIG. 2 shows a cross-sectional view of the linear unit along to line II—II in FIG. 1.
Figure 3:
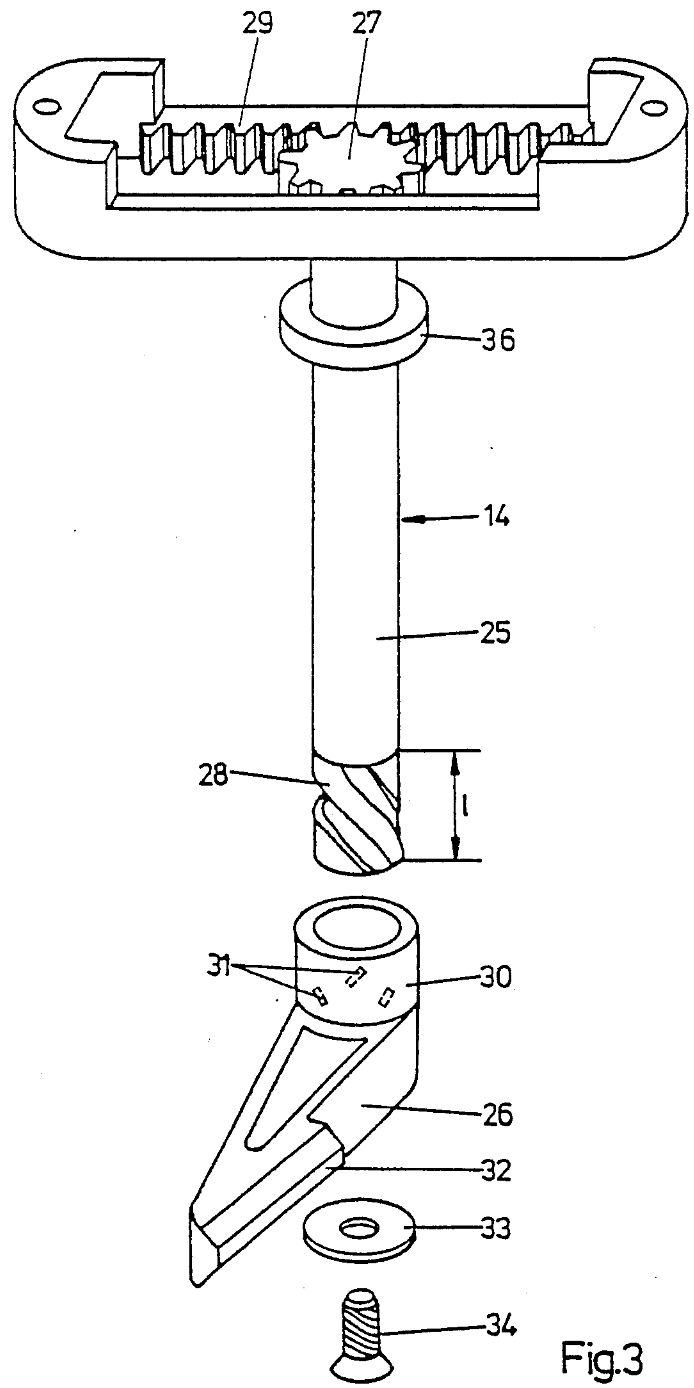
FIG. 3 shows an exploded view of a gripper of the linear unit shown in FIGS. 1 and 2.

Every gripper 14 comprises a vertical gripping arm 25, which is supported so as to be rotatable in the lower carriage 20 with a collar 36, and a gripping finger 26 which is movable in a swiveling manner on the gripping arm 25. As can be seen clearly in FIG. 3, the gripping arm 25 carries a toothed pinion 27 at one of its ends so as to form one piece and is provided at the other end with a helix 28 having a defined axial length 1. The toothed pinion 27 meshes with a toothed rack 29 which is fastened to the upper carriage 19. The upper carriage 19 accordingly carries a total of four toothed racks 29 which are arranged on a side of the assigned toothed pinion 27 such that during the relative displacement of the upper carriage 19 in one displacing direction, a resulting rotational movement of the gripping arm 25, causes swivelling of the gripping fingers 26 toward one another in a closing movement for the workpiece 10, and during the displacement of the upper carriage 19 relative to the lower carriage 20 in the opposite direction the inverse rotating direction of the gripping arms 25, which is brought about by means of this, swivels the gripping fingers 26 away from one another in an opening movement for the workpiece 10. The gripping finger 26 which projects away from the gripping arm 25 at a right angle comprises a bushing 30 which is coaxial with the gripping arm 25 and overlaps the helix 28. The helix 28 is constructed so as to have three threads, and the inner wall of the hollow-cylindrical bushing 30, in a corresponding manner, carries three sliding cams 31 which are offset relative to one another at the circumference, one sliding cam 31 engaging in each instance in a helix thread of the helix 28. The gripping finger 26 carries a gripping surface 32 at the front end with which the gripping finger 26 contacts the workpiece 10 to be grasped. A stop disk 33 is fastened, e.g. with a countersunk screw 34, on the front side of the gripping arm 25 defining the helix 28. A helical pressure spring 35 is placed on the gripping arm 25 and is supported on one side at the bushing 30 of the gripping finger 26 and on the other side at the lower carriage 20, so that the gripping finger 26 is constantly loaded in the direction of the stop disk 33. Each gripping finger 26 on each gripping arm 25 contacts the stop disk 33 when the gripper arrangement is opened, that is, when the workpiece 10 is not gripped (FIGS. 1 and 2).

The movement sequence of the grippers !4 which is forced by the excess lift $h_{rel}$ of the upper carriage 19 relative to the lower carriage 20 in the pick-up position 16 and in the delivery position 17 of the carriage 18 is divided into a horizontal swiveling movement and a vertical displacing movement of all the gripping fingers 26 due to the toothed rack and pinion gearing 27, 29 between the upper carriage 19 and the gripping arm 25 and as a result of the helix-and-sliding cam connection 28, 31 between the gripping arm 25 and the gripping finger 26. In the pick-up position 16, the horizontal swiveling movement is followed by the vertical displacing movement, whereas in the delivery position 17 the gripping fingers 26 first execute a vertical displacing movement and then a horizontal swiveling movement.

In the pick-up position 16, in which the workpiece 10 is gripped, the horizontal swiveling movement of the gripping fingers 26 is a closing movement directed toward the workpiece 10 and the vertical displacing movement is a lifting movement lifting the workpiece 10; whereas, in the delivery position 17, the vertical displacing movement of the gripping fingers 26 is a lowering movement and the horizontal swiveling movement is an opening movement directed away from the workpiece 10. The axial length 1 of the helix 28 is dimensioned somewhat smaller than the excess lift $h_{rel}$ of the upper carriage 19 relative to the lower carriage 20. The lifting movement of the gripping fingers 26 is accordingly terminated somewhat sooner than the rotation of the gripping arms 25 caused by the toothed rack portions 29 and the toothed pinion 27. Accordingly, in this remaining residual lift, the gripping fingers 26 fixed on the gripping arms 25 after the end of the lifting movement are turned slightly further in the direction of the workpiece 10. However, since the gripping surfaces 32 of all the gripping fingers 26 already contact the workpiece 10 in a force-locking manner, the contact pressure force of the gripping fingers 26 at the workpiece 10 is increased by means of this rotating movement of the gripping arms 25, so that a reliable holding of the workpiece 10 in the gripper arrangement formed from the four grippers 14 is ensured during the movement of the carriage 18.

The linear unit operates as follows during the transferring of a workpiece 10. The workpiece 10 is brought into the pick-up position 16 of the linear unit 13 with the double-belt conveyor belt 11. The carriage 18 is displaced toward the left, as seen in FIG. 1, toward the end stop 22. The lower carriage 20 impacts at the end stop 22 with its spacing piece 24 and its movement is blocked. The upper carriage 19 continues to move until it likewise contacts the end stop 22, wherein it covers the distance of the excess lift $h_{rel}$. All gripping arms 25 are rotated by this excess lift $h_{rel}$ via the toothed racks 29 and the toothed pinions 27 (the gripping arm 25 shown in FIG. 3 executes a rotation in the counterclockwise direction). All gripping fingers 26 are swiveled toward the workpiece 10 by these rotating movements of the gripping arms 25 until their gripping surfaces 32 contact the workpiece 10. The horizontal swiveling movement of the gripping fingers 26 is accordingly blocked, and the continued rotating movement of the gripping arms 25 leads to a lifting movement of the gripping fingers 26 via the helix 28 and the sliding cams 31 sliding in the latter, so that the workpiece held by the gripping surfaces 32 is lifted vertically from the conveyor belt 11. An additional closing movement of the gripping fingers 26 in the direction of the workpiece 10 is effected at the end of the helix 28—as was described above—by means of a slight residual rotation of the gripping arms 25, so that the holding force with which the workpiece 10 is held by the gripper arrangement is increased. FIG. 2 shows the gripping finger 26 of the right-hand gripping arm 25 during its closing movement toward the workpiece 10, while the gripping finger 26 of the left-hand gripping arm 25 is shown after the end of its lifting movement The helical pressure spring 35 is compressed during the lifting movement of the gripping finger 26.

The carriage 18 is now moved into the right-hand delivery position 17, as seen in FIG. 1, by the drive of the upper carriage 19. In the delivery position 17, the lower carriage 20, which projects over the front side of the upper carriage 19 by an amount corresponding to the excess lift $h_{rel}$, impacts at the end stop 23 with its front side and its displacing movement is blocked, while the upper carriage 19 can still move until the end stop 23 by an amount corresponding to the excess lift $h_{rel}$. All gripping arms 25 are rotated again by this relative movement of the upper carriage 19 relative to the stationary lower carriage 20. The excessive gripping force is first reduced, then a lowering movement of the gripping fingers 26 is carried out until the gripping fingers 26 contact the stop disks 33 at the end of the gripping arms 25 accompanied by the action of the helical pressure springs 35. The gripping fingers 26 are accordingly rigidly connected with the gripping arms 25 and the additional rotating movement of the gripping arms 25 causes a horizontal swiveling of the gripping fingers 26, wherein the gripping surfaces 32 move away from the workpiece 10. At the end of the rotating movement of the gripping arms 25, the gripping fingers 26 occupy the position seen in FIG. 1. The workpiece 10 is deposited on the conveyor belt 12 and is transported away by the latter from the delivery position 17. The described process is repeated every time a workpiece 10 is transferred.

The invention is not limited to the described embodiment example. Thus, the spacing piece 24 for determining the excess lift of the upper carriage 19 can also be arranged at the end stop 22. The helix 28 on the gripping arm 25 and the sliding cams 31 on the inner wall of the bushing 30 which slide in the helix 28 can also change places.

In a preferred embodiment, end stops 22, 23, 24 are assigned only to the lower carriage 20 carrying the grippers 14, and the lower carriage 20 is supported between axial stop shoulders of the driven upper carriage 19 so as to be displaceable at the upper carriage 19 by a distance corresponding to the excess lift $h_{rel}$. This has the advantage that the excess lift $h_{rel}$ is a fixed magnitude independent of the adjustment of the pick-up and delivery positions of the lower carriage 20 and the grasped workpieces and workpiece carrier, respectively, are held with the same contact pressure force of the gripping fingers 26.

If the force-locking engagement between the gripping fingers 26 and the workpiece or workpiece carrier brought about solely by the helical pressure spring 35 in connection with the helix drive 28, 31 is sufficiently great, the length of the helix 28 can be dimensioned in such a way that there is still free helix length available at the end of the relative movement between the two carriage parts 18, 20. In this case, workpieces and workpiece carriers whose dimensions deviate from one another within certain limits can also be grasped and transferred. Of course, the required rotating movement of the gripping arms until the stop of the gripping fingers at the object will be smaller with a large workpiece than with small objects. However, the residual rotation of the gripping arms forced by the toothed rack and pinion gearing is converted into a lifting movement of the gripping fingers, so that larger workpieces can be lifted correspondingly farther than smaller workpieces.

The described embodiment can only receive a workpiece in one end position of the carriage 19, 20 and deposit in the other end position. However, the arrangement can also be carried out in an advantageous manner in such a way that a pick-up and depositing is possible in both end positions, i.e. in such a way that transportation can be effected in both directions. For this purpose, means are provided, e.g. a second pneumatic drive, which displace the lower carriage 20 relative to the unmoved upper carriage 19 by an amount corresponding to the excess lift $h_{rel}$ in every end position

We claim:

1. A linear unit for transferring workpieces located on an assembly or manufacturing belt, said linear unit comprising a first carriage part horizontally displaceable along support structures between pick-up and delivery positions; a second carriage part displaceable parallel to said first carriage part and connected for movement therewith by friction contact; a gripper supported on said second carriage part for rotation about a vertical axis for grasping a workpiece; stop means ending in a displacement path of said second carriage part, said stop means shortening the displacement path of said second carriage part relative to a displacement path of said first carriage part and providing for movement of said second carriage part relative to said first carriage part when said first carriage part reaches one of the pick-up and delivery positions; and drive means for converting the relative movement of said first and second carriage parts into horizontal rotational and vertical movement of said gripper, said gripper including a vertical gripper arm and a gripper finger rotatably supported on said gripper arm, said drive means including a pinion fixedly supported on said gripper arm, a toothed rack associated with said first carriage part and engaging said pinion for providing a horizontal rotational movement that corresponds to one of closing and opening movements of said gripper, and coarse thread connection means arranged between said gripper arm and said gripper finger and engagable with said gripper finger for providing a vertical movement that corresponds to one of pick-up and delivery movements of said gripper.

2. A linear unit as set forth in claim 1 wherein said gripper arm has a free end, said linear unit further comprising a stop disc arranged at said free end of said gripper arm; and a return spring for biasing said gripper finger into engagement with said stop disc, said coarse thread connection means including a coarse thread having a pitch which is so selected that a torque applied to said gripper by said return spring in cooperation with said coarse thread causes a rigid connection of said gripper finger with said gripper arm upon relative rotational opening movement at which said gripper finger moves away from engagement with the workpiece.

3. A linear unit as set forth in claim 2 wherein said return spring is formed as a helical compression spring mounted on said gripper arm and having opposite ends engaging said gripper finger and said second carriage part, respectively.

4. A linear unit as set forth in claim 1 wherein said coarse thread connection means includes a multiple thread helix arranged on one of said gripping arm and said gripping finger and a plurality of cams arranged on the other of said gripping arm and said gripping finger, corresponding in number to a number of threads of said helix, and guided in said helix.

5. A linear unit as set forth in claim 1 wherein said coarse thread connection means has an axial length which is less than a magnitude of relative movement between said first and second carriage parts.

6. A linear unit as set forth in claim 1 wherein said stop means includes a plurality of stops defining said pick-up and delivery positions and extending along end positions of both of said first and second carriage parts, said first and second carriage parts having an identical end position in a direction of joint movement thereof, said linear unit further comprising a spacing member extending in the direction of joint movement of said first and second carriage part and arranged on one of an end surface of said second carriage part and a stop facing said end surface, said spacing member having a length that defines a magnitude of relative movement between said first and second carriage part.

* * * * *